Feb. 12, 1952 — L. A. METCALF — 2,585,669
CULTIVATOR ATTACHMENT
Filed Aug. 11, 1948
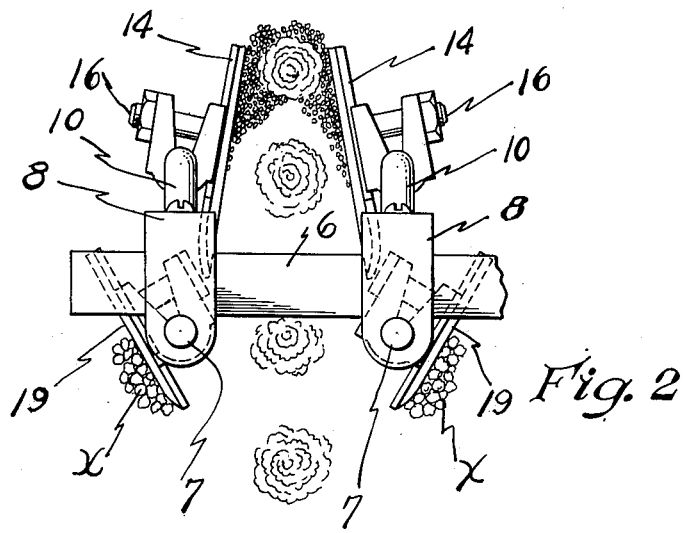
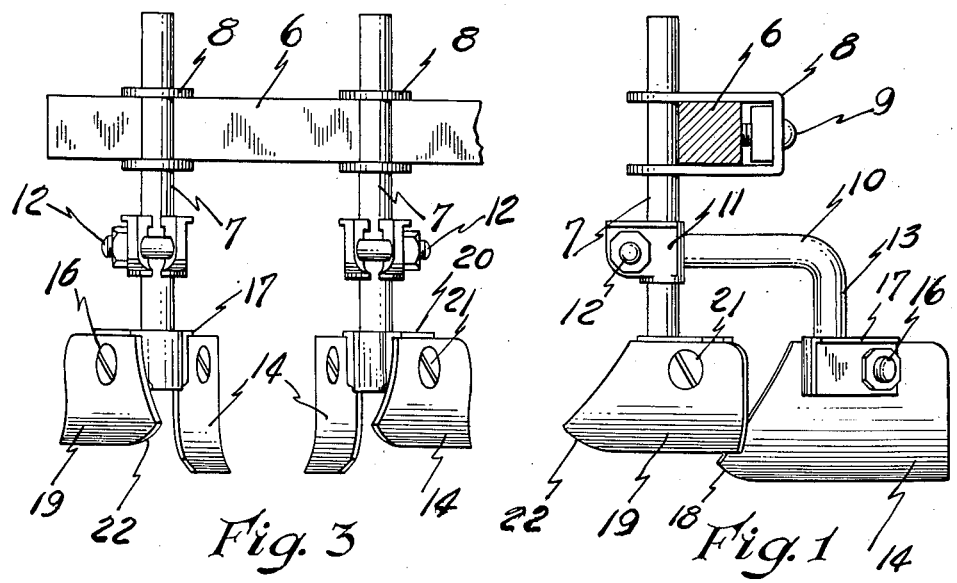
INVENTOR.
Lee A. Metcalf.
BY Frank C. Kearman
ATTORNEY Patented Feb. 12, 1952

2,585,669

UNITED STATES PATENT OFFICE 2,585,669

CULTIVATOR ATTACHMENT

Lee A. Metcalf, Fairgrove, Mich.

Application August 11, 1948, Serial No. 43,672

2 Claims. (Cl. 97—56)

This invention relates to agricultural implements, and more specifically to cultivator attachments provided with spaced blades to move dirt away from or towards the roots of the plants being cultivated.

One of the prime objects of the invention is to design a very simple, practical, and substantial attachment which is readily attachable to the beam of a cultivator or other vehicle for crowding fine dirt between small growing plants, and covering small weeds and other undesirable growth after the plants are of sufficient size to permit such cultivating operation, thus eliminating the necessity of frequent hoeing and the manual labor incident thereto.

Another object is to design a cultivator attachment comprising spaced-apart blades mounted in tandem relation, which will not throw or roll the dirt over the small plants etc., the front blade shifting lumps, clods, stones and other debris out of the path of travel of the fine dirt shifting blade, thus eliminating the possibility of stones, clods, lumps, etc. being thrown or rolling on, bending, breaking, or otherwise injuring the plants.

A further object is to provide a simple, practical and economical dirt shifting means arranged in tandem relation for smoothly and uniformly crowding and shifting the dirt to suit the size of the plants being cultivated.

Still a further object is to provide an attachment which can be economically manufactured and assembled, which can be readily attached and/or detached, which is readily adjustable to suit the work to be performed, and which can be set to operate very close to small plants without injury thereto.

A further object still is to design a cultivator blade attachment, so designed and arranged that the blades crush, cut through and break any crust that forms on the ground and which might otherwise break the plant or uproot it or shift sections of crusted or caked dirt, with plants therein, out of row alignment, as would occur with cultivator attachments of conventional design.

A further object is to design a cultivator attachment including rotatably adjustable blades, together with means for rigidly securing the blades in adjusted position.

A further object still is to design an attachment which permits faster operation of the cultivator, without rolling or throwing the soil, and which is readily adjustable to suit plants of various sizes.

Still a further object is to provide a cultivating attachment in which the blades are mounted in tandem relation and which in use tends to lead the blades out of instead of into the ground; consequently, there will be little snagging or tendency to bury when engaging roots, heavy stones or other foreign matter, and the tendency will be to force the blades up instead of down, minimizing bending and breakage of the blades and support etc.

When crops such as beans, potatoes, beets and similar produce are planted in rows, it is usually customary to hoe between the plants to remove all weeds from the row. This is expensive, requires considerable time, disturbs the roots of the plants, is tedious work, and sometimes it is necessary, due to weather conditions, to hoe several times, and I have, therefore, provided simple, practical, and inexpensive means whereby this hoeing operation is eliminated, said means shifting the soil immediately adjacent the rows, so that it covers and smothers the small weeds between the plants, and also supplies additional dirt around the roots of the plants, this additional dirt serving the retain the moisture around said roots, and it further serves to drain water away from the plants in a wet season.

To the accomplishment of the foregoing and related ends, said invention then consists in the means hereinafter fully described and particularly pointed out in the claims, the annexed drawing and following description setting forth, in detail, certain means and one mode of carrying out the invention, such disclosed means and mode illustrating, however, but one of the various ways in which the principle of the invention may be used.

In the drawing:

Fig. 1 is a side-elevational view showing my improved cultivating attachment, the cultivator beam being shown in section.

Fig. 2 is a top, plan view showing a pair of cultivator attachments, and illustrating the crowding action for crowding lumps away from the row of plants and shifting fine dirt between the plants of a row of plants.

Fig. 3 is a front-elevational view of one pair of attachments.

Referring now more specifically to the drawing in which I have shown the preferred embodiment of my invention, and in which the cultivator bar or beam is indicated at 6, said beam usually extending transversely of the cultivator (not shown), and the shanks 7 of the attachments "B" are secured thereto by means of U- shaped clamps 8, which clamps straddle the beam, the free ends of the clamps being bored in the usual manner to accommodate the upper ends of the shanks 7, and setscrews 9 serve to secure the shanks to the beam 6.

The attachments "B" are mounted in tandem relation in pairs as shown, and are shiftable longitudinally on the beams to suit the plants and widths of rows, and they are further vertically and revolvably adjustable so that they can be set to operate at any desired angle.

A rearwardly projecting blade support 10 is mounted on the shank 7 at a point intermediate its length, and a split clamp 11 is formed on one end as shown, a bolt 12 serving to secure the support in position on the shank.

The rear end of the support 10 is turned downwardly as at 13, and a blade 14 is mounted thereon, a clamp 15 being secured to the blade in any approved manner, and a bolt 16 serves to rigidly clamp the blade in position and permits vertical and rotatable adjustment when desired, a horizontally disposed rib 17 being provided on the upper edge of the clamp, and the upper edge of the blade bears thereagainst to form a rigid connection.

The blade 14 is formed as clearly shown in Figs. 1 and 3 of the drawing, and I wish to direct particular attention to the fact that the lower edge is upwardly curved as at 18 so that as the cultivator is drawn, this upwardly rounded edge rides upon, crushes, and breaks any crust formed on the ground, the angle at which the blade is set determining the volume of dirt shifted.

The front blade 19 is shaped substantially the same as the blade 14; a clamp 20 is formed integral with or can be welded thereto, and a bolt 21 serves to clamp it in set position. It has a rounded lower edge 22 to ride on and break any crust, and is adjustable both vertically and rotatably, the same as the blade 14.

These blades are mounted in tandem relation, and the front blade 19 is set somewhat higher than the rear blade, as it is designed to shift stones, lumps, debris, etc. "X" away from the plant rows, so that the follower blade operates in fine, level dirt only. The rear blade is set deeper than the front blade and shifts a uniform volume, depending on the depth and angle at which it is set, between the plants "P," covering and smothering the small weeds, as above described. The blades can be easily and quickly adjusted; it is merely necessary to loosen bolts 16 and 21, adjust the blades as desired, and again tighten the bolts.

From the foregoing description, it will be obvious that I have perfected a very simple, practical, and effective cultivator attachment, which breaks up crusted soil, shifts lumps, clods and other debris away toward the center of the rows, and then shifts fine soil between the plants.

What I claim is:

1. An agricultural attachment for mounting on the beam of a conventional cultivator comprising, a pair of transversely spaced-apart, vertical shank members mounted on said beam, rearwardly and downwardly extending blade supports adjustably mounted on said vertical shanks at points intermediate their lengths, blades mounted on said shank members and blade supports respectively, with the front pair of blades disposed at an angle away from each other to smooth the soil and shift lumps away from a row of plants, and the rear set of blades disposed at an angle toward each other to shift soil toward and in between the plants in the row, said rear set of blades being vertically and horizontally adjustable on said vertical shank members.

2. An agricultural attachment adapted to be mounted on the beam of a cultivator for smoothing and shifting the soil comprising, a pair of vertically disposed, transversely spaced shank members, rearwardly and downwardly extending blade supports mounted for vertical and horizontal adjustment on said shank members, front blades mounted on said shank and rear blades mounted on said blade supports and spaced rearwardly from the front blades with the cutting edge of the front blades spaced a predetermined distance above the cutting edge of the rear companion blades, each of said blades being formed with an upwardly curved nose portion on the front edge thereof for riding on and breaking the crust on the ground as the device is operated said blades being mounted for individual adjustment about independent axes.

LEE A. METCALF.

REFERENCES CITED

The following references are of record in the file of this patent:

UNITED STATES PATENTS

| Number | Name | Date |
| --- | --- | --- |
| 27,174 | Vowles | Feb. 14, 1860 |
| 309,361 | Ruhl | Dec. 16, 1884 |
| 344,296 | Welty | June 22, 1886 |
| 378,377 | Schermerhorn et al. | Feb. 21, 1888 |
| 456,167 | Stanley | July 21, 1891 |